US010696092B2

(12) United States Patent
Lafuente et al.

(10) Patent No.: US 10,696,092 B2
(45) Date of Patent: Jun. 30, 2020

(54) METHOD AND APPARATUS FOR MANUFACTURING SPOKES

(71) Applicant: DT SWISS INC., Grand Junction, CO (US)

(72) Inventors: Alberto Lafuente, Orpund (CH); Benedikt Barandun, Roveredo (CH); Adrian Scheidegger, Bolligen (CH)

(73) Assignee: DT SWISS INC., Grand Junction, CO (US)

( * ) Notice: Subject to any disclaimer, the term of this patent is extended or adjusted under 35 U.S.C. 154(b) by 507 days.

(21) Appl. No.: 15/232,497

(22) Filed: Aug. 9, 2016

(65) Prior Publication Data
US 2017/0057280 A1 Mar. 2, 2017

(30) Foreign Application Priority Data
Aug. 25, 2015 (DE) .......................... 10 2015 114 053

(51) Int. Cl.
*B60B 1/02* (2006.01)
*B21F 39/00* (2006.01)
(Continued)

(52) U.S. Cl.
CPC ............ *B60B 1/0246* (2013.01); *B21F 39/00* (2013.01); *B21J 7/02* (2013.01); *B60B 1/0269* (2013.01);
(Continued)

(58) Field of Classification Search
CPC . B60B 1/0246; B60B 1/003; B60B 2310/208; B21J 7/02; B21J 7/145;
(Continued)

(56) References Cited

U.S. PATENT DOCUMENTS 6,497,042 B1 * 12/2002 Dietrich .................. B60B 1/041
29/894.333
10,335,580 B2 * 7/2019 Chludzinski .......... A61M 25/09
(Continued)

FOREIGN PATENT DOCUMENTS

CN 2136704 6/1993
DE 60954 A 2/1892
(Continued)

OTHER PUBLICATIONS

German Search Report from German Patent Application No. 102015114053.5, dated Jul. 27, 2016.
(Continued)

*Primary Examiner* — Sarang Afzali
*Assistant Examiner* — Darrell C Ford
(74) *Attorney, Agent, or Firm* — Greer, Burns & Crain, Ltd.

(57) ABSTRACT

A method and a device are provided for manufacturing spokes from a wire material, in particular for at least partially muscle-powered two-wheeled vehicles. The spokes include a spoke shaft having at least two shaft sections. The shaft sections differ in at least one cross-section. For shaping the cross-sections, the wire material is reshaped at least in sections by means of a shaping tool. The relative position of the wire material relative to the shaping tool is varied in the axial direction during reshaping. For shaping the cross-sections in the two shaft sections the relative position of the wire material relative to the shaping tool is varied by way of different positioning movements.

17 Claims, 3 Drawing Sheets

(51) Int. Cl.
  *B21J 7/02* (2006.01)
  *B60B 1/00* (2006.01)
  *B21J 7/14* (2006.01)
(52) U.S. Cl.
  CPC ............ *B21J 7/145* (2013.01); *B60B 1/003* (2013.01); *B60B 2310/208* (2013.01); *Y10T 29/4951* (2015.01); *Y10T 29/49506* (2015.01); *Y10T 29/49508* (2015.01); *Y10T 29/49512* (2015.01)
(58) Field of Classification Search
  CPC ............ B21F 39/00; Y10T 29/49506; Y10T 29/49508; Y10T 29/4951; Y10T 29/49512
  USPC ......... 29/894.33, 894.331, 894.332, 894.333
  See application file for complete search history.

(56) References Cited

U.S. PATENT DOCUMENTS

| | | | | |
|---|---|---|---|---|
| 2005/0161998 | A1* | 7/2005 | Passarotto | B60B 1/003 301/61 |
| 2005/0173971 | A1* | 8/2005 | Passarotto | B60B 1/003 301/104 |
| 2007/0063574 | A1* | 3/2007 | Mercat | B60B 1/0207 301/55 |
| 2007/0257089 | A1* | 11/2007 | Chen | B21C 3/08 228/173.1 |
| 2013/0285436 | A1* | 10/2013 | Davoine | B60B 1/003 301/55 |
| 2013/0320749 | A1* | 12/2013 | Connolly | B60B 1/042 301/58 |

FOREIGN PATENT DOCUMENTS

| | | |
|---|---|---|
| DE | 76604 | 10/1893 |
| DE | 102486 | 3/1898 |
| DE | 102486 A | 4/1899 |
| DE | 466866 | 10/1928 |
| DE | 466866 A | 10/1928 |
| DE | 531261 A | 8/1931 |
| DE | 8915288 U1 | 4/1990 |
| DE | 19533572 C2 | 1/1998 |
| DE | 202004001185 U1 | 7/2005 |
| FR | 2375928 | 7/1978 |

OTHER PUBLICATIONS

Mueller, Heinrich, "The forming of wire to near-net shape," Wire Industry (1994), 61(10), pp. 689-692.
European Search Report from European Patent Application No. 16185247.0, dated Jan. 23, 2017.

* cited by examiner

METHOD AND APPARATUS FOR MANUFACTURING SPOKES

BACKGROUND

The present invention relates to a method and an apparatus for manufacturing spokes of a wire material.

Stress-resistant and reliable spokes are an essential feature of high-quality wheels for bicycles. Other than spokes made of spoke wire, some spokes are manufactured of non-metallic materials such as fiber-reinforced plastics. However, metal wire spokes still show many advantages over spokes of other materials, thus offering possibilities of manufacturing light-weight and permanent, durable wheels specifically in the field of sports bicycles.

In the case of metal spokes, the decrease of the spoke wire to different diameters is a particularly significant step, since it allows considerable weight savings. The methods used and the machinery employed are particularly significant since they have a great impact on the durability and stability of the spokes. Thus, e.g. spoke wire drawing as it is described in DE 466 866 is rather disadvantageous to the material structure and thus to its stability under load. Reducing machines which reduce the diameter by hammering have been found to be particularly advantageous. This improves the toughness of the wire material and enhances the stability under load of the spoke.

The machines known in the prior art per se allow reliable manufacturing of spokes where the desired different thicknesses can be adjusted with sufficient precision. However, different wheel types and spoke insertion systems require a great variety of spoke types showing different sections of varying thickness and different lengths of transition sections between the different thickness sections. The known manufacturing machines and manufacturing methods only achieve comparatively rough tolerance ranges so that transition sections may turn out to be longer or shorter in different and in particular even in the same types of spokes. Although these tolerances actually do not affect the technical quality of the spokes they cause optical differences which are undesirable. To prevent these differences in a finished wheel, the spokes may be selected or classified prior to mounting. However, this considerably increases the operating steps and produces more rejects.

It is therefore the object of the present invention to provide an improved manufacturing of spokes, in particular yielding higher precision and narrower tolerances.

SUMMARY

This object is solved by a method for manufacturing spokes wherein each of the present spokes comprises at least one spoke shaft having at least two shaft sections. The shaft sections differ at least in a cross-section. To configure the cross-sections, the wire material is reshaped at least in sections by means of at least one shaping tool. Further advantages and features of the invention can be taken from the exemplary embodiments.

The inventive method serves to manufacture spokes from a wire material. The wire material is in particular reshaped in at least one processing section. The relative position of the wire material relative to the shaping tool is varied in the axial direction during reshaping. For shaping the cross-sections, the relative position of the wire material relative to the shaping tool is varied in the at least two shaft sections by way of different positioning movements.

The method according to the invention has many advantages. It is a considerable advantage that the relative position of the wire material is varied by applying different positioning movements. This allows considerable improvement to the dimensional consistency of the manufactured spokes. Considerably narrower tolerances can be realized. In particular, in the case of spokes having different cross-sectional shapes, a higher precision can be achieved in the transition regions, the so-called tapers. This will as a rule eliminate the need for selecting the spokes for installation in a wheel since the normal production tolerances are sufficiently small to exclude e.g. optical differences.

The spokes manufactured with the apparatus are in particular suitable for at least partially muscle-powered two-wheeled vehicles and preferably for muscle-powered bicycles. The spokes are also for bicycles assisting the muscular force by means of a motor such as pedelecs. The spokes may also be provided for electric-only bicycles. It is also possible to provide the spokes for tricycles and/or four-wheeled vehicles or else for motorcycles. The spokes are in particular suitable for (at least partially) tangential and (at least partially) radial spoke insertion.

The finished spokes may e.g. be configured as round spokes and/or flat spokes. Other shapes are conceivable as well, such as bladed spokes, saber spokes, aero spokes. To obtain non-round cross-sections in the finished spoke, one or more spoke shaft sections are reshaped and in particular embossed, preferably after reducing the diameter. The invention improves dimensional consistency. Reproducibility of the spokes is enhanced and the dimensional tolerance can be improved in particular in the transition regions between different shaft sections. The manufacturing precision of the transition regions is increased and provides for better optical appearance. This is advantageous in particular for manufacturing flat spokes or other spokes having non-round sections. Reducing the diameter of a spoke section from 2.0 mm to 1.5 mm and then embossing the spoke section enhances reproducibility of the transition regions from thin to thick and flat to round.

The spoke shafts are in particular configured as single-butted, double-butted, and/or 3D spokes. The wire material is in particular a spoke wire and preferably a spoke wire of a metal or a metal wire. In the scope of the present invention the term wire material may preferably be replaced by the term spoke wire. Suitable metal materials are used for the material, such as steel, aluminum, titanium, magnesium, and/or composite materials.

It is possible to shape the cross-section of at least a first shaft section by varying the relative position of the wire material relative to the shaping tool by way of at least one first positioning movement and to shape the cross-section of at least one second shaft section by varying the relative position of the wire material relative to the shaping tool by way of at least one second positioning movement and for the first positioning movement to differ from the second positioning movement.

It is particularly preferred to vary the relative position by means of a positioning movement ensuring an even, homogeneously reshaping course in the longitudinal direction of the wire material. The positioning movement preferably takes place by moving the wire material. The wire is for example pushed and/or in particular drawn.

In a particularly preferred specific embodiment, the positioning movements differ by their effective speed. The effective speed corresponds in particular to the duration of shaping the section having the respective cross-section relative to the length of the section having the respective cross-section. The effective speed in particular takes into account not only the speeds of the actual movements but also stops or standstill during reshaping. The positioning movements are in particular significantly different. The effective speeds differ for example by a minimum of 5% or 10% or more. A smaller or larger difference is also possible. The matching of speeds during processing respectively reshaping is particularly advantageous to the dimensional consistency and thus to the optical appearance. The speeds may be varied in steps or else continuously.

The positioning movements may differ in their maximum and/or minimum speeds. It is possible for the positioning movements to have identical effective speeds. One of the positioning movements is for example performed including at least one stop or multiple stops compensated by higher maximum speeds. It is possible to keep the speed constant. Or else it is possible for the speed to be variable, for example increasing and/or decreasing over time. These configurations are particularly advantageous since the speeds employed during reshaping have considerable impact on the precision and quality of the reshaping process.

It is preferred for at least one positioning movement to be performed at intermittent speeds. It is also possible to perform at least one positioning movement at a continuous speed. The intermittent speed comprises in particular controlled speed variations which are in particular relevant to the reshaping process. Very short-term speed variations during starting or stopping at the start or end points of a positioning movement preferably do not qualify as controlled speed variations in the sense of the present invention. For example, one shaft section may be processed at a constant speed while another shaft section is reshaped at another speed that is constant over a specified time or at a speed showing controlled increase and/or decrease over a specified time.

At least one of the positioning movements is preferably a continuous movement. These continuous positioning movements are in particular characterized by an absence of standstills or stops. The continuous movement may be performed at a consistent or variable speed. Such a continuous movement is in particular provided for a shaft section having a constant cross-section. Continuous positioning movements allow particularly fast reshaping of spoke sections.

At least one positioning movement may be an incremental movement. Incremental movements are in particular characterized by at least one standstill and/or at least one stop. It is also possible for the incremental movement to show a so-called pilger motion. Changes to the direction of movement may be provided. A movement into one direction is for example followed by partial movement in the opposite direction. This allows processing shaft sections multiple times respectively redundant processing. Incremental movements are preferably employed for shaft sections having a variable cross-section. Uniform, soft or continuous speed transitions are likewise possible.

In all the configurations, the shaping tool preferably rotates about a longitudinal axis of the wire material. The shaping tool is for example received in a rotary tool head which rotates about the longitudinal axis of the wire material during reshaping. This configuration offers the advantage to allow using shaping tools which only act on part of the wire material circumference while still ensuring even, regular reshaping over the entire circumference of the wire material. The shaping tool is in particular rotated about the longitudinal axis of the wire material on which hammering is being applied repeatedly. Particularly preferably, the rotational speed and/or the angular speed of the shaping tool is matched to the positioning movement and in particular to the speed of the positioning movement. This synchronization allows even, regular reshaping with precisely configured transitions between different cross-sections. The rotational speed may be varied while a spoke is being processed.

Preferably, at least one positioning movement is interrupted for a predetermined time interval. The time interval of the interrupted positioning movement in particular corresponds at least to the duration of a rotation of the shaping tool about the longitudinal axis of the wire material. For example, the advance of the wire material is stopped while the shaping tool is rotated once or several times about the wire material. It is also possible for the time interval of the interrupted positioning movement to correspond to at least one eighth or one fourth or one half rotation of the shaping tool. Or else the time interval may correspond to three quarters of a rotation of the shaping tool. It is also possible to interrupt the positioning movement over an extended time, for example for two or three or four or a plurality of rotations of the shaping tool. These measures enable a reproducible transition in the transition regions and/or at the spoke ends. Then the transition regions can be precisely adapted to the form of the shaping tool.

Or else it is possible for the time interval of the interrupted positioning movement to correspond at least to the duration of setting at least one characteristic magnitude for reshaping. For example, a reduction depth and/or an embossed dimension may be adjusted by displacing the shaping tool. Then, the advance is preferably stopped during adjustment. Or else, setting may be done during an ongoing positioning movement.

The shaping of shaft sections having identical cross-sections is preferably provided by way of identical positioning movements. The identical cross-sections show in particular a consistent transverse dimension, for example a maximum and/or minimum diameter. Or else it is possible for the identical cross-sections to show identical cross-sectional shapes.

Shaping cylindrical shaft sections is preferably performed by positioning movements at identical effective speeds. It is possible to provide different diameters for the cylindrical shaft sections which are reshaped at identical effective speeds. It is also possible to provide identical maximum and/or minimum speeds for the positioning movement. It is also possible to provide these settings for shaping oval shaft sections or complex respectively tapered cross-sectional shapes.

A particularly preferred specific embodiment provides for shaft sections having variable cross-sections to be shaped by way of a positioning movement at a lower effective speed than is provided for shaping shaft sections having a consistent cross-section. This configuration offers the advantage of a high processing speed for simple shaft sections while high dimensional consistency can be achieved in more complex configurations of shaft sections. Thus, manufacture on the whole achieves narrow tolerances while concurrently ensuing economic throughput. The shaft sections having variable cross-sections may for example be conical or cone-shaped.

Shaft sections having variable diameters are preferably shaped by means of positioning movements at lower effective speeds than in the immediately adjacent shaft sections if the shaft section having a variable diameter is configured as a taper between two cylindrical shaft sections each having different diameters. In these tapers the decrease of the speed of the positioning movement is particularly effective on dimensional consistency.

Particularly preferably the shaft section serving as a taper is configured cone-shaped. Or else it is possible for the shaft section serving as a taper to be configured conical. The taper may be curved wherein the curve is characterized by at least one function. The taper may be characterized by at least one variation of the cross-sectional shape. These tapers are present for example in a transition from a shaft section configured as a flat spoke to a cylindrical shaft section.

Particularly preferably, the effective speed and/or the maximum speed of the positioning movement is reduced prior to reaching the taper. The effective speed and/or the maximum speed is preferably increased after the taper. The effective speed and/or the maximum speed of the positioning movement remains in particular even during the taper. It is possible to reduce the speed of the positioning movement already prior to reaching the taper. It is also possible to reduce the speed of the positioning movement only in the region of the taper. The speed of the positioning movement is preferably increased again only after shaping the taper. It is also possible to increase the speed of the positioning movement already while shaping the taper.

It is possible to provide for incremental positioning movements while shaping a taper. Standstills of the positioning movement may for example be provided. Standstills of the positioning movement are for example used for adapting a characteristic dimension of reshaping. The reduction depth is for example set during a standstill. To this end, the shaping tool may be at least partially displaced.

It is particularly preferred to provide the positioning movement in dependence on a rotational speed of the shaping tool about the longitudinal axis of the wire material. It is also possible to provide the positioning movement in dependence on the applied hammering rate of the shaping tool on the wire material. The effective speed and/or the maximum speed and/or the minimum speed of the positioning movement are in particular set in dependence on the rotational speed and/or the hammering rate of the shaping tool. Adjusting the positioning movement and in particular setting the effective and/or maximum speed of the positioning movement is in particular synchronised with the rotational speed and the hammering rate of the shaping tool respectively. Such synchronisation allows to ensure modifications in respect of the positioning movement in optimal coordination with a possible or actual speed of the reshaping process.

It is possible to set the effective speed and/or the maximum speed of the positioning movement in dependence on the diameter of the cross-section of the shaft section. It is possible to choose the effective speed and/or the maximum speed of the positioning movement to be higher inversely proportional to the intended reduction of the wire material. It is for example possible to set the reduction depth by way of choosing the effective and/or maximum speed of the positioning movement. For example, if less reduction of the wire material is provided, a higher speed for the positioning movement is chosen.

It is furthermore preferred in all the configurations to reshape the cross-sections of the wire material at least in sections by way of hammering applied by the shaping tool. The wire material is particularly preferably reduced by hammering by means of the shaping tool. It is also possible for the shaping tool to act on the wire material by bucking and/or embossing. For shaping the cross-sections, the shaping tool or another, separate shaping tool may act on the wire material in different ways of reshaping, in particular by way of compression forming. These configurations offer the advantage of considerably improving the toughness of the spokes. These reshaping processes thus offer considerable advantages for example over reshaping by drawing techniques.

To adjust the diameter of a cross-section, the reduction depth of the shaping tool is adjusted by at least one adjustment device. It is also possible to adjust at least one other reduction dimension by means of the adjustment device. The duration of setting the shaping tool is in particular taken into account when choosing the speed of the positioning movement. It is also possible to stop the positioning movement while the adjustment device is adjusting the shaping tool. The speed of the positioning movement is in particular reduced during adjustment by the adjustment device.

The shaping tool preferably consists of at least two opposed tool units. The tool units are in particular employed in synchrony.

The tool units are preferably operated in synchrony. Particularly preferably, the tool units act on the wire material by hammering in synchrony. It is also preferred to rotate the tool units about the longitudinal axis of the wire material while applying hammering. The tool units are in particular arranged opposed. It is also possible for one of the two tool units to apply hammering on the wire material while the other of the tool units serves as an abutment. Particularly preferably the shaping tool comprises four tool units opposed to one another in pairs. The pairs of the tool units are employed alternatingly, successively, in synchrony. Preferably the two tool units of a pair are operated in synchrony.

In all the configurations, it is furthermore particularly preferred to perform the positioning movement by advancing the wire material. The positioning movement for example comprises drawing and/or pushing the wire material. At least one feeding device may be provided therefor. The feeding device is for example configured as an advancing device. It is also possible to perform the positioning movement by displacing the shaping tool. It is also possible to displace both the wire material and the shaping tool.

The inventive device serves to manufacture spokes from a wire material. The spokes are in particular provided for at least partially muscle-powered two-wheeled vehicles. The spokes each comprise at least one spoke shaft having at least two shaft sections. The shaft sections differ by at least one cross-section. The device comprises at least one reshaping device. The reshaping device is suitable and configured to configure the cross-sections by reshaping the wire material at least in sections by means of at least one shaping tool.

The reshaping device is suitable and configured to vary the relative position of the wire material relative to the shaping tool in the axial direction during reshaping by means of at least one feeding device. The feeding device is suitable and configured to vary the relative position of the wire material relative to the shaping tool for shaping the cross-sections of the at least two shaft sections by way of different positioning movements.

The device according to the invention shows the advantage to allow manufacturing spokes showing particular dimensional consistency and precision. Moreover, the device enables particularly high throughput in manufacturing. The device can be operated in particular according to the methods described above. The device comprises in particular at least one control device. The control device is in particular suitable and configured to synchronize the positioning movement by way of a rotary motion of the shaping tool about a longitudinal axis of the wire material. The control device is preferably also suitable and configured to operate the positioning movement in synchrony with an adjustment device for adjusting a reduction dimension.

In all the configurations of the device and the method according to the invention, the advance rate or the relative speed of the relative motion between the wire material and the reshaping device is preferably controlled and preferably varied while a spoke is being processed. The relative speed may temporarily be very low, zero or even negative, e.g. to enable particularly intensive processing of one or more sections.

In all the configurations, reshaping and in particular forging the spoke wire consisting of a wire material preferably occurs incrementally. The shape of the spoke is in particular achieved by a plurality of blows. After reshaping by hammering the spoke shows as a rule a round outer contour over the spoke length. Thereafter at least one further reshaping process e.g. by embossing may be provided to form the spoke over at least a longitudinal section of the substantially round spoke to a desired different cross-sectional shape, e.g. a bladed shape. There the spoke is configured as a flat spoke and/or is flattened knife-like.

In specific embodiments of all the configurations, it is preferred for the reshaping device to be configured as, or to comprise, a reducing head. The reducing head comprises (at least) one outer head and (at least) one inner head which are rotatable relative to one another. In particular, the inner head is configured rotatable. The speed of rotation of the inner head is preferably between approximately 500 and 2000 revolutions per minute (rpm).

Particularly preferably the rotational speed of the inner head is between approximately 750 and 1500 rpm. A preferred rotational speed is ca. 925 rpm. In a specific configuration the rotational speed of the inner head may be varied between approximately 800 and 1400 rpm.

Particularly preferably, the reshaping device comprises four tool units and one actuating device configured as a hammering roller device comprising a plurality of hammering roller units that are substantially fixed or stationary in the peripheral direction and displaceable (in particular rotating around the spoke wire) hammering roller units. The number of the rotary hammering roller units preferably correlates with the number of the tool units and/or the number of the stationary hammering roller units. The number of the rotary hammering roller units is particularly preferably larger than the number of the stationary hammering roller units. Preferably the number of the rotary hammering roller units is an even number. The number of the displaceable hammering roller units is preferably not an integer multiple of the number of the stationary hammering roller units. The number of the displaceable hammering roller units particularly preferably differs by 2 from an integer multiple of the number of the stationary hammering roller units.

Preferably, the number of the stationary hammering roller units is 4 and the number of the rotary hammering roller units is larger than or equal to 6. Particularly preferably, the number of the rotary hammering roller units is 14. Given four tool units engaged in pairs with the spoke wire and 14 hammering roller units displaceable in the peripheral direction and four hammering roller units fixed in the peripheral direction, a speed of e.g. 900 rpm results in a number of 210 blows per second on the spoke wire so as to allow an effective and high-quality manufacture of spokes.

The (axial) advance rate respectively relative speed between the spoke and the reshaping device is in particular between 0.005 and 0.04 m/s and particularly preferably between 0.0075 and 0.025 m/s.

Given a spoke length of 300 mm, the resulting processing times are between 5 and 40 seconds depending on the initial diameter and reduced diameter.

Reducing the diameter serves not only to reduce weight but in particular also to improve the mechanical properties, similar to the principle of a uniform strength bolt in which a reduction relieves stresses at the head and the screw shaft by means of the "elastic" center part. Presently the diameter-reduced section acts as the "elastic" center part.

BRIEF DESCRIPTION OF THE DRAWINGS

Further advantages and features of the present invention can be taken from the description of the exemplary embodiments which will be discussed below with reference to the enclosed figures.

The figures show in.

DETAILED DESCRIPTION

Figure 1:
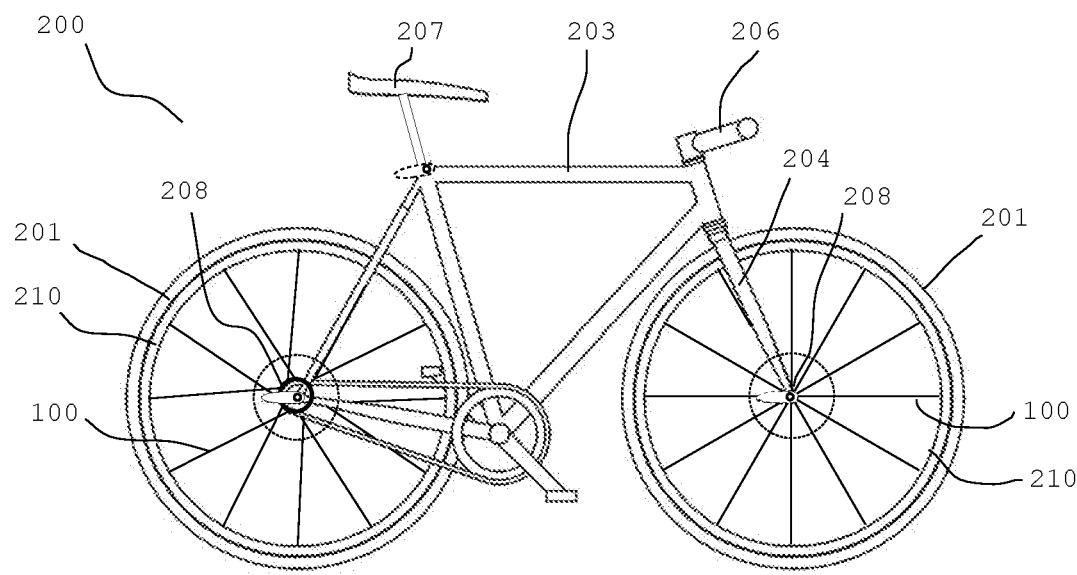
FIG. 1 a schematic view of a bicycle.

FIG. 1 shows a schematic illustration of a two-wheeled vehicle 200 configured as a bicycle. The bicycle comprises two wheels 201, a front wheel and a rear wheel. Furthermore, a frame 203, a fork 204, a handlebar 206, and a saddle 207 are provided. The drive is provided by pedals and in this case, a derailleur. The front wheel and the rear wheel are each attached to dropouts at the fork 204 respectively the frame 203. The front wheel and the rear wheel 101, 102 each comprise a rim 210 and spokes 100 manufactured by means of the device according to the invention and connected with a hub 208. Due to the image scale the spokes 1 are shown schematically only and will be illustrated in more detail with reference to FIG. 2.

Figure 2:
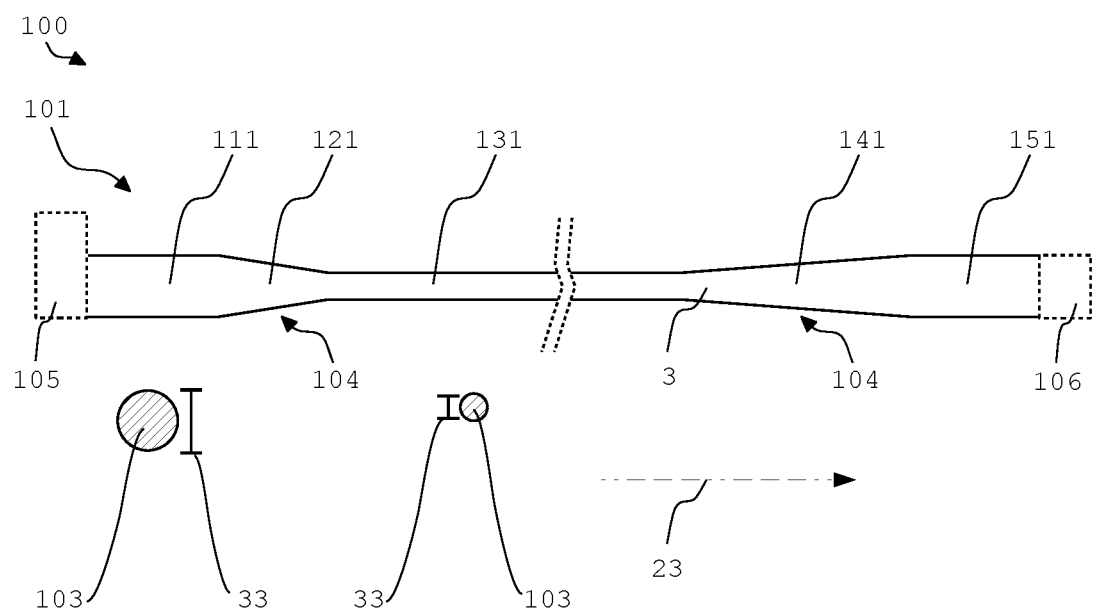
FIG. 2 a schematic view of a spoke.

FIG. 2 illustrates a schematic longitudinal view of a spoke 100 manufactured by way of the method according to the invention. The figure is not true to scale to better illustrate the principle. Two exemplary cross-sections 103 of the spoke are illustrated hatched. The cross-sections 103 differ in their diameters 33. The transitions between the regions of different diameters 33 are provided by the tapers 104. The tapers 104 differ in their lengths and in their gradients. An arrow indicates the longitudinal axis 23 of the spoke.

The spoke 100 has been manufactured by reshaping wire material 3. The wire material used is a special spoke wire which has a tensile strength of e.g. 1200 N/mm$^2$ and more. The spoke wire was reduced by hammering on the respective cross-sections 103 respectively 33.

The spoke 100 has a spoke head 105 at one of its ends and at the other of its ends, an external thread 106 which serves to screw it to a spoke nipple, which is not shown. The spoke shaft 101 extends between the two ends. The first end 105 is for attachment to the hub 208. The spoke 200 extends outwardly from the hub 208 to the second end 106 where the external thread is then attached to the rim 210 by means of a spoke nipple.

This spoke 100 is exemplarily configured as a double-butted spoke. Other spoke shapes are also conceivable such as single-butted spokes or else flat spokes. This spoke shaft 101 has undergone controlled reshaping in various shaft sections 111, 121, 131, 141, 151. The two shaft sections 111, 151 at the ends 105, 106 are configured cylindrical, having a cross-section 103 with a diameter of 2.0 mm. The shaft section 131 lying between is likewise cylindrical and has a cross-section 103 with a diameter 33 of 1.5 mm.

Such reduction of the spoke shaft 101 allows to noticeably reduce the weight while concurrently maintaining and even increasing the required stability. The tapers 104 are shaped so as to counteract an unfavorable notch effect and to allow a particularly stable transition. The shaft section 121 closer to the head 105 has a shorter taper 104 than does the shaft section 141 lying closer to the other end 106. This configuration takes account of the forces occurring in the wheel 201 which act on the spoke 100.

Figure 3:
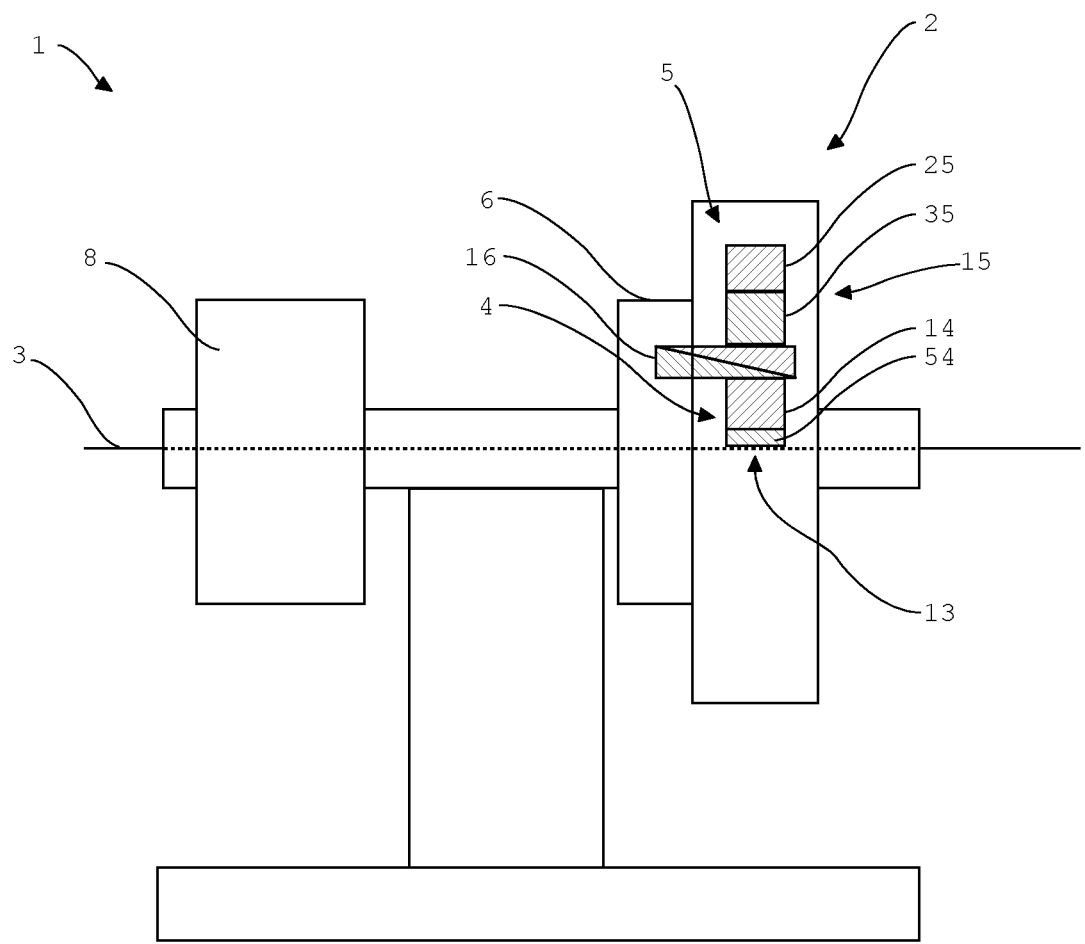
FIG. 3 a simplistic illustration of a device according to the invention.

FIG. 3 exemplarily shows the device 1 according to the invention for manufacturing spokes 100. The device 1 may be operated according to the method according to the invention. The device 1 comprises a reshaping device 2 for reshaping wire material 3. The wire material 3 is fed through the reshaping device 2 by means of a feeding device 8 which is presently configured as an advancing device.

The reshaping device 2 comprises a shaping tool 4 having two or four pairs of opposed tool units 14, of which only one tool unit 14 is shown for better clarity. An actuating device is provided for actuating the shaping tool 4. The actuating device 5 is configured as a hammering roller device 15 which comprises a plurality of stationary hammering roller units 25 and displaceable hammering roller units 35.

An adjustment device 6 is provided for setting a reduction rate. The adjustment device 6 comprises a wedge device 16 disposed between the hammering roller unit 35 and the tool unit 14. Axial displacement of the wedge device 16 adjusts the distance between the hammering roller unit 35 and the tool unit 14 to allow adapting the reduction depth accordingly.

Figure 4:
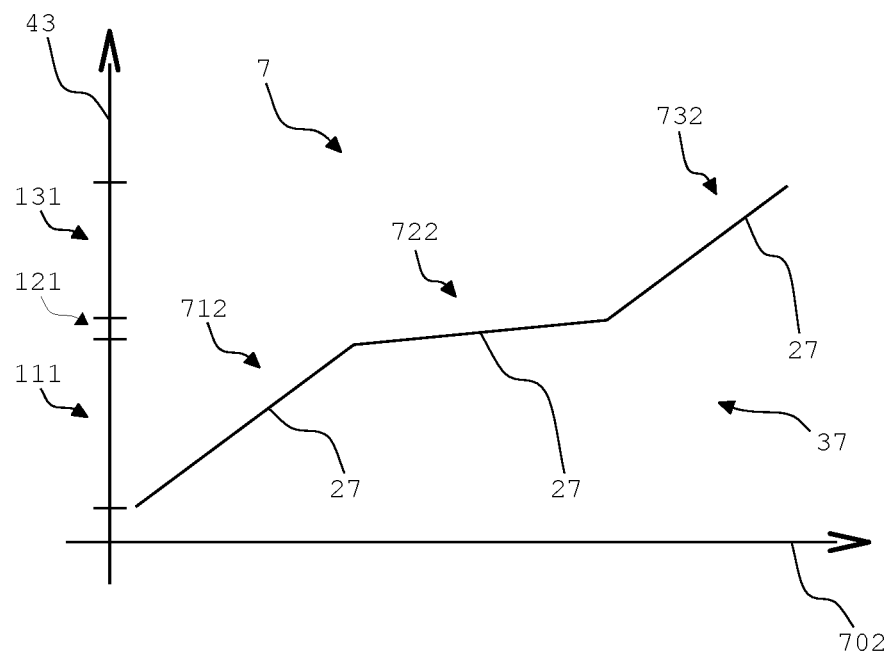
FIG. 4 a simplistic drawing of various positioning movement paths.

FIG. 4 shows an exemplary process pattern of the method according to the invention. The relative position 43 of the wire material 3 was plotted in relation to the shaping tool 4 versus the time 702. This results in a characteristic path including each of the different positioning movements 7 during reshaping of the wire material 73. The different positioning movements 7 comprise a first positioning movement 712, followed by a second positioning movement 722 and a third positioning movement 732. The drawn path reflects the maximum speeds 27 of the positioning movements 7. Each of the positioning movements 7 is performed as a continuous movement 37.

The respective relative positions 43 correspond to specific positions of the shaping tool 4 during the processing along the spoke shaft 101. The presently shown path exemplarily shows reshaping of a spoke shaft 101 having a total of three different shaft sections 111, 121, 131. The wire material 3 is first taken to a relative position 43 where reshaping of the first shaft section 111 begins. This shaft section is for example cylindrical and is processed by way of a suitable, rapid speed 27. The same applies to the third shaft section 131.

The second shaft section 121 is exemplarily configured as a taper 104 between the first shaft section 111 and the third shaft section 131. Since the taper 104 exemplarily undergoes conical or cone-shaped reshaping, the speed 27 is accordingly reduced for the time 702 of processing. This allows particular precise shaping of the taper 104 showing very narrow tolerances.

Figure 5:
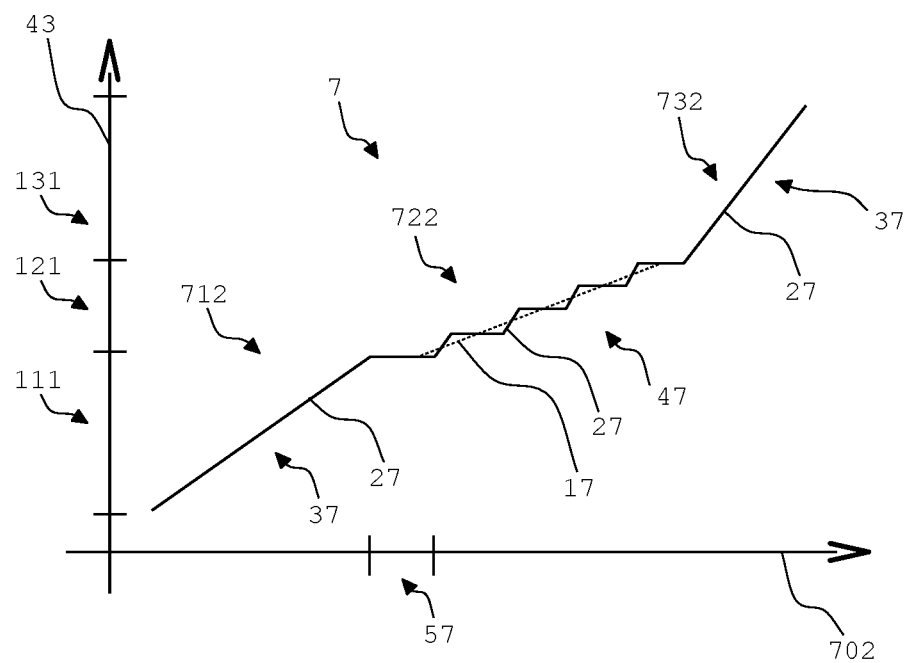
FIG. 5 a simplistic drawing of further positioning movements.

FIG. 5 shows another outline of an exemplary path of positioning movements 7. Similarly, to the description in FIG. 4, a spoke 100 having a spoke shaft 101 consisting of a total of three shaft sections 111, 121, 131, is reshaped. The first positioning movement 712 is performed at a lower speed 27 than is the third positioning movement 732.

This controlling of the wire feed is useful for example in manufacturing a double-butted spoke whose shaft sections 111, 131 show different cross-sections respectively different diameters 33 at their two ends 105, 106. For example, if the diameter 33 of the spoke shaft 101 is smaller, the processing speed 27 may be lower since the wire material 3 is reduced more in this position. Or else it is possible to provide positioning at the same or similar speeds 27 even given different degrees of reduction of the spoke shaft 101.

For shaping the second shaft section 121 the presently shown process flow comprises a positioning movement 722 that is configured as an incremental movement 47. Such incremental movement 47 provides for temporarily stopping the positioning movement 7 and temporarily bringing it up to a specific maximum speed 27. The stop of the positioning movement 7 lasts for a specific time interval 57. This time interval 57 corresponds for example to the duration of one rotation or part of one rotation of the shaping tool 4 about the wire material 3. Or else it is possible to match the time interval 57 to the duration of adjusting the shaping tool 4. The maximum speed 27 between stops can be chosen accordingly higher. Thus there results an overall effective speed 17 allowing correspondingly fast reshaping and thus an economic manufacturing throughput. Varying the speed may be done continuously over a spoke section or part of a spoke section.

It is in particular possible to choose a positioning movement 7 respectively speed of the relative motion between the spoke shaft and the reshaping device e.g. in the spoke sections 121 and 141 in FIG. 2 that differs from that in the spoke sections 111 or 131. In spoke sections where the thickness varies, a lower speed can in particular be chosen. Then, care is taken for the spoke shape in the respective spoke sections 121 and 141 to precisely adapt to the shape of the tool so that narrow tolerances can be achieved since the shape of the spoke section corresponds to the shape of the tool.

The spoke sections 111 and 151 having maximum diameters may be provided for no processing at all.

The presently shown method allows manufacturing spokes 100 having particularly narrow tolerances in particular in the region of the tapers 104. A tolerance of less than +/−0.5 mm can be realized for example in the region of the tapers 104. The tolerance of the methods known thus far is e.g. up to 3 mm and more. The method according to the invention thus achieves a considerable increase of dimensional consistency. Moreover, these precise transitions also offer an improved optical appearance and improved aerodynamic properties.

The increased dimensional consistency achieved with the method according to the invention is an advantage in particular for flat spokes respectively bladed spokes. Flat spokes having a wide tolerance range tend to comprise cylindrical regions or too large transverse dimensions so that problems may arise when inserting spokes through the rim hole. On the whole the method according to the invention offers considerable advantages in manufacturing spokes which can be employed in particular in building high-end wheels.

While a particular embodiment of the present method and device has been described herein, it will be appreciated by those skilled in the art that changes and modifications may be made thereto without departing from the invention in its broader aspects and as set forth in the following claims.

| List of reference numerals: | |
|---|---|
| 1 | apparatus |
| 2 | reshaping device |
| 3 | wire material |
| 4 | shaping tool |
| 5 | actuating device |
| 6 | adjustment device |
| 7 | positioning movement |
| 8 | feeding device |
| 14 | tool unit |
| 15 | hammering roller device |
| 16 | wedge device |
| 17 | speed |
| 23 | longitudinal axis |
| 25 | hammering roller unit |
| 27 | speed |
| 33 | diameter |
| 35 | hammering roller unit |
| 37 | movement |
| 43 | relative position |
| 47 | movement |
| 54 | head section |
| 57 | time interval |
| 100 | spoke |
| 101 | spoke shaft |
| 103 | cross section |
| 104 | taper |
| 105 | spoke head |
| 106 | external thread |
| 111 | shaft section |
| 121 | shaft section |
| 131 | shaft section |
| 141 | shaft section |
| 151 | shaft section |
| 200 | two-wheeled vehicle, bicycle |
| 201 | wheel |
| 203 | frame |
| 204 | fork |
| 206 | handlebar |
| 207 | saddle |
| 208 | hub |
| 210 | rim |
| 702 | time |
| 712 | positioning movement |
| 722 | positioning movement |
| 732 | positioning movement |

The invention claimed is:

1. A method of manufacturing spokes from a wire material by a reshaping device for at least partially muscle-powered two-wheeled vehicles, the method comprising:
providing spokes made with the wire material, each of the spokes comprising at least one spoke shaft having at least two shaft sections, wherein the at least two shaft sections differ in at least one cross-section;
shaping the cross-sections of the at least two shaft sections by forging using a shaping tool of the reshaping device, wherein the shaping tool reduces a diameter of the wire material by a plurality of blows while varying the relative position of the wire material relative to the shaping tool in an axial direction by at least one feeding device of the reshaping device, wherein movement of the wire material relative to the shaping tool during shaping of the cross-sections of the at least two shaft sections is at different speeds; and
adjusting a reduction depth of the shaping tool to adjust the diameter of the wire material using at least one adjustment device of the reshaping device.

2. The method according to claim 1, wherein the movements of the wire material relative to the shaping tool during shaping of the cross-sections of the at least two shaft sections differ in at least one of maximum speeds and minimum speeds.

3. The method according to claim 1, wherein movement of the wire material relative to the shaping tool during shaping of the cross-sections of the at least two shaft sections is at least one of an intermittent speed and at a continuous speed.

4. The method according to claim 1, wherein at least one movement of the wire material relative to the shaping tool during shaping of the cross-sections of the at least two shaft sections is a continuous movement.

5. The method according to claim 1, wherein at least one movement of the wire material relative to the shaping tool during shaping of the cross-sections of the at least two shaft sections is an incremental movement.

6. The method according to claim 1, wherein the shaping tool is rotated about a longitudinal axis of the wire material and wherein movement of the wire material relative to the shaping tool during shaping of the cross-sections of the at least two shaft sections is interrupted for a specified time interval and the time interval of the interrupted movement corresponds at least to the duration of one rotation of the shaping tool about the longitudinal axis of the wire material.

7. The method according to claim 1, wherein the shaping of the at least two shaft sections having identical cross-sections is performed by identical movements of the wire material relative to the shaping tool.

8. The method according to claim 1, wherein the shaping of cylindrical shaft sections is performed by movements of the wire material relative to the shaping tool having identical effective speeds.

9. The method according to claim 1, wherein the shaping of a shaft section having variable cross-sections is performed by movements of the wire material relative to the shaping tool that is at an effective speed that is lower than when shaping a shaft section having a consistent cross-section along a designated length.

10. The method according to claim 1, wherein the shaping of a shaft section having variable diameters, which serves as a taper between two cylindrical shaft sections each having a different diameter, the movement of the wire material relative to the shaping tool is performed at an effective speed that is lower than in the immediately adjacent shaft sections.

11. The method according to claim 10, wherein the shaft section serving as a taper is configured cone-shaped or conical.

12. The method according to claim 11, wherein at least one of the effective speed and the maximum speed of the movement of the wire material relative to the shaping tool during shaping is reduced prior to reaching the taper and is increased after the end of the taper.

13. The method according to claim 11, wherein the movement of the wire material relative to the shaping tool is performed in increments during the taper.

14. The method according to claim 1, wherein the effective speed of one of the movements takes place in dependence on at least one of a rotational speed of the shaping tool about the longitudinal axis of the wire material and a hammering rate of the shaping tool.

15. The method according to claim 1, wherein the effective speed of one of the movements is adjusted in dependence on the diameter of the cross-section of the shaft section.

16. The method according to claim 1, wherein the shaping tool comprises at least two opposed tool units, and wherein the tool units act on the wire material in synchrony by hammering.

17. The method according to claim 1, wherein the forging of the wire material by the shaping tool continues during execution of the different axial movements of the wire material relative to the shaping tool.

\* \* \* \* \*